United States Patent [19]
Vadnais et al.

[11] Patent Number: 4,874,922
[45] Date of Patent: Oct. 17, 1989

[54] GRANULE VISE FOR MANUFACTURING A MAGNETIC HEAD CORE WITH A GLASS FILLET ADJACENT THE INNER EDGE OF THE GAP

[75] Inventors: Timothy W. Vadnais, Victoria; Douglas J. Hennenfent, Minneapolis, both of Minn.

[73] Assignee: Impris Technology Incorporated, Minnetonka, Minn.

[21] Appl. No.: 277,732

[22] Filed: Nov. 30, 1988

[51] Int. Cl.$^4$ ............................................. H05B 1/00
[52] U.S. Cl. .................................... 219/243; 219/390; 100/94 P; 432/124; 432/162; 29/603
[58] Field of Search ................. 29/603; 219/243, 390; 100/93 P; 432/137, 124, 162, 206

[56] References Cited

U.S. PATENT DOCUMENTS 3,639,701  2/1972  Secrist et al. ..................... 179/100.2
3,672,045  6/1972  Robertson ............................. 29/603

OTHER PUBLICATIONS

Cheatham et al, "Magnetic Head Construction," IBM Tech. Disclosure Bull., vol. 19, No. 2, Jul. 1976, p. 397.
Daniels et al, "Diffusion Bonding of Dissimilar Ceramics" IBM Tech. Discl. Bull., vol. 20, N. 10, Mar. 1978, p. 4088.
Kehr et al, "Ferrite-Ferrite Diffusion Bonded Recordig Head" IBM Tech. Discl. Bull., vol. 21, No. 6, Nov. 1978, pp. 2212-2213.
Chow et al, "Diffusion Bonding Fixture" IBM Tech. Disclosure Bull., vol. 24, No. 3, Aug. 81, p. 1496.
Rigby, E. B., "Diffusion Bonding of NiZn Ferrite and Nonmagnetic Materials," IEEE Transactions on Magnetics, vol. Mag-20, No. 5, Sep. 1984, pp. 1503-1505.

*Primary Examiner*—P. W. Echols
*Attorney, Agent, or Firm*—Edward P. Heller, III

[57] ABSTRACT

Apparatus for compressing against each other for bonding by use of a granule clamp the I and C bars which comprise the O bars from which head cores may be cut, includes a rotating frame so that the angular orientation of the O bars may be changed after embedding them in the granules. This allows bonding glass rods to be placed in the interior openings of the unbonded O bars and then by rotating the frame, cause the glass rods to fall into a position adjacent to the interior edge of the flux gap, and at the same time keep the plane of the flux gaps normal to the axis of the granule clamp's pressure die. When heat is then applied to the unbonded O bars, gravity draws the bonding glass into a fillet adjacent the interior edge of the flux gap.

1 Claim, 4 Drawing Sheets

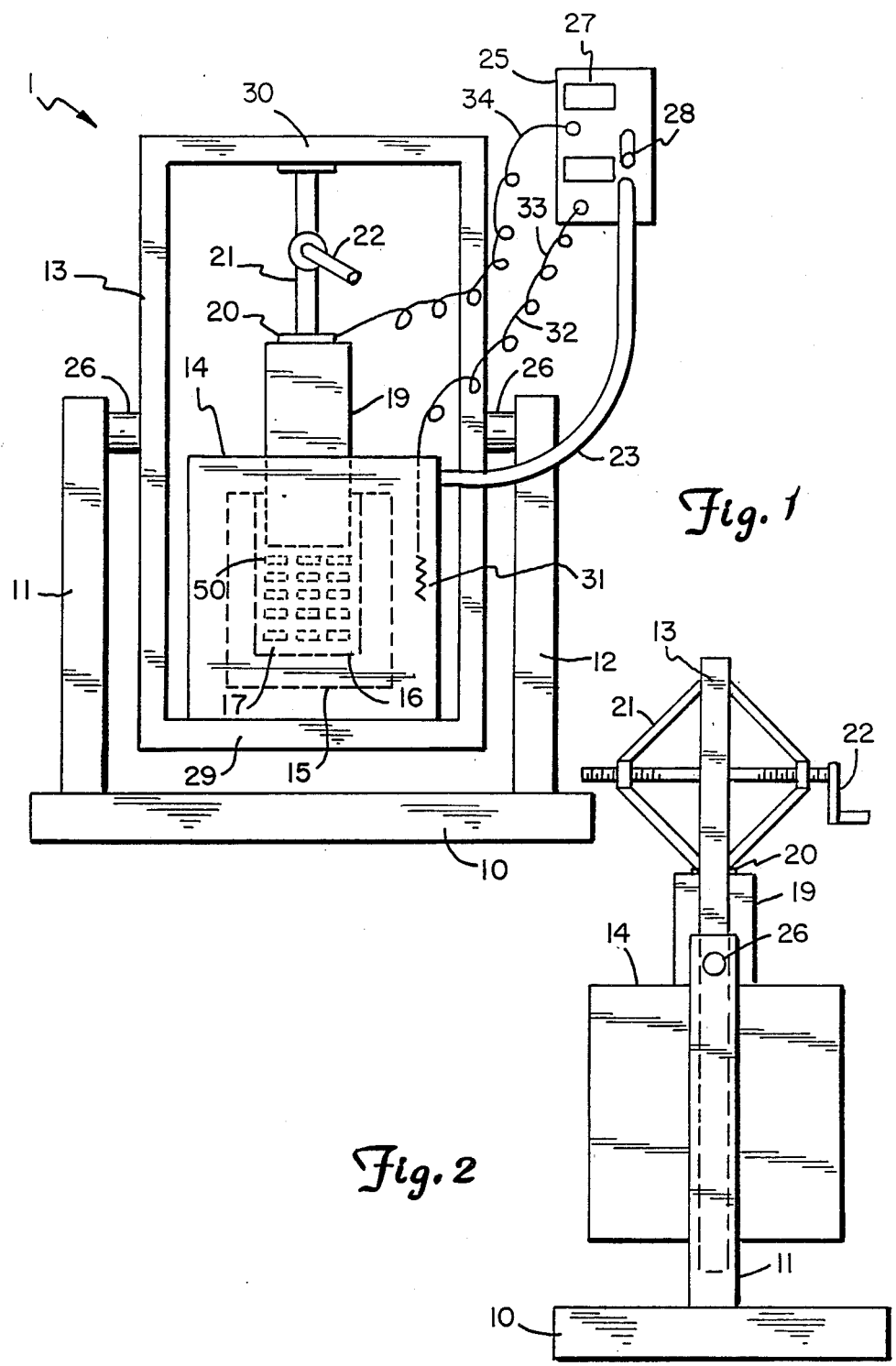

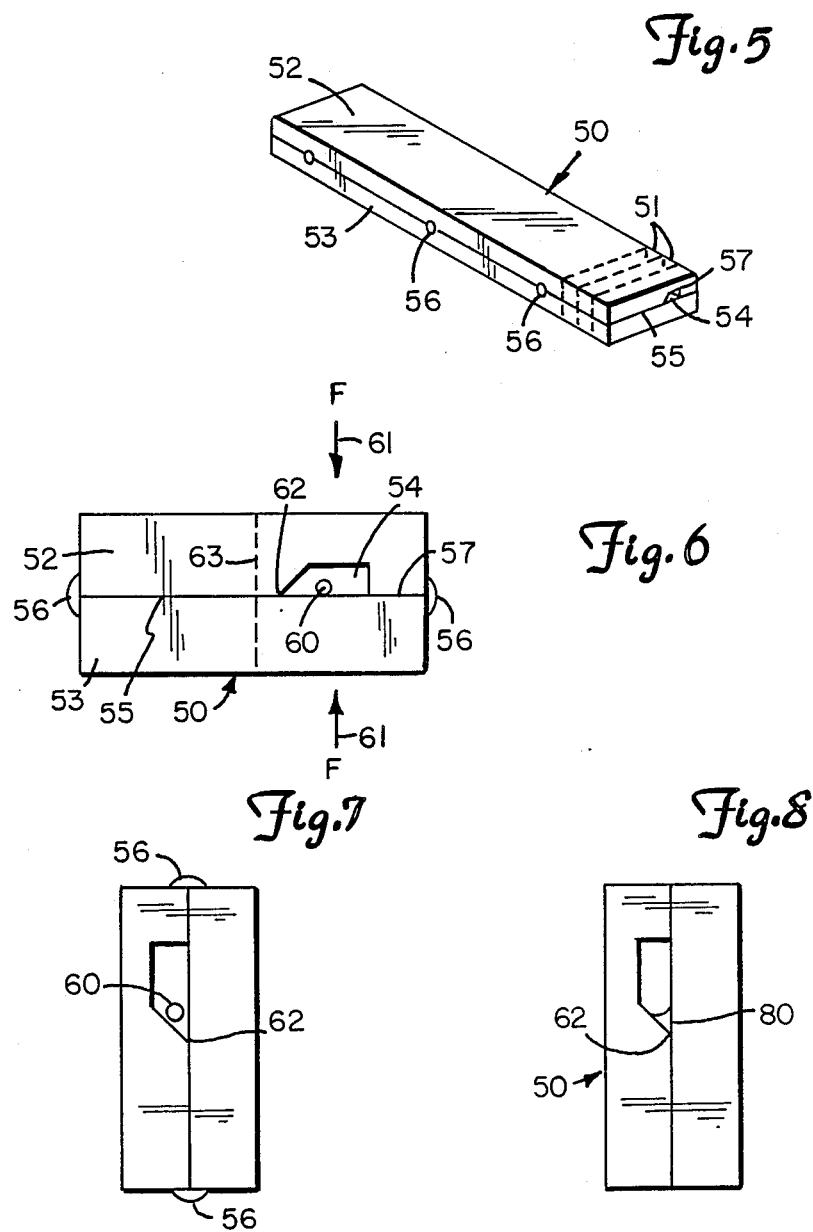

GRANULE VISE FOR MANUFACTURING A MAGNETIC HEAD CORE WITH A GLASS FILLET ADJACENT THE INNER EDGE OF THE GAP

BACKGROUND/INFORMATION DISCLOSURE STATEMENT

In the various types of data recording systems based on use of a magnetic medium, a magnetic transducer head is used to create the magnetic patterns in the medium and to read back the data after recording it. The typical magnetic head has an O-shaped core element which provides a magnetic flux path including a flux gap across which flux fringing occurs. During reading and writing, the flux gap is placed in close proximity with the medium, and the medium is moved with respect to the gap. The fringing flux during writing enters the medium, causing the magnetic patterns to be created therein. The flux flow for the writing process is created by a winding through which the flux path passes.

During reading, the medium is again moved relative to the gap, and the magnetic pattern in the medium causes flow of flux in the flux path, which flux flow recreates the magnetic pattern in the medium. By detecting, i.e. converting it to an electrical signal, this flux flow can be converted into the original data. During reading, voltage across this same winding can be used to detect the flux flow, or a separate flux-detecting element such as a magneto-resistive element can be used.

There are two types of magnetic recording heads now in general use. The older type has a ferrite or other core providing the flux path and a separate wire winding for writing and reading. The newer is formed by photolithographic processes and is typically referred to as a thin film recording head. The invention forming the subject matter here is concerned with the ferrite core type of recording head.

The complete O core of a ferrite core head typically comprises a C core element, so called because it is in the shape of a C, and an I core element having an elongated rectangle shape. The I core and C core elements are attached to each other in some manner with the I core element connecting the arms of the C core element to thereby close the flux path. One of the connecting points between these two elements forms the flux gap. Typically, the flux gap is formed of a hard non-magnetic material such as glass or alumina. The two facing surfaces of the I core and the C core which define the flux gap are called the gap faces.

To make the individual cores used for the heads, a C bar element whose cross section is uniformly identical to that of an individual C core element, is bonded to an I bar element whose cross section is uniformly identical to that of the individual I core elements. Usually the I and C bars are from 50 to 100 times as long as the finished core width, with the gap width substantially smaller than the core width. A thin layer of gap material is placed, now usually by a sputtering process, at the interface corresponding to the gap of the finished cores. The I bar is then clamped to the C bar to close its ends, in combination with it assuming, if one uses his or her imagination, the shape of an O bar. (Hereafter, a C bar with an I bar juxtaposed in the position to form an O bar, but before these bars are bonded to each other, will be referred to as an unbonded O bar.) The unbonded O bar is then heated to a temperature sufficient to fuse the gap material to the adjacent I or C bar gap face, fixing the gap length and bonding the bars to each other in the O bar shape. (By gap length is meant the spacing of the I bar from the C bar, and is by analogy to the direction of movement of the magnetic medium to the transducer heads of which the O bar will become a part.) The bonded O bar resulting is then sawed transversely into individual cores which can be wound and mounted in a suitable support. For use in rigid disk drives, these cores are mounted in slots in hard ceramic sliders which are designed to aerodynamically fly in close proximity to the disk surfaces.

The individual O bars are quite small, with a typical example being perhaps one inch long and less than a tenth of an inch in the width and height dimensions.

It is necessary to accurately control the gap length for each individual core which will be eventually sawed from an O bar, since gap length interrelates with the other core dimensions and parameters of the medium as well and deviations from the design gap length can adversely affect performance. Control of gap length has always been a difficult problem because of the small dimension involved, on the order of 20$\mu$inches (about 0.5$\mu$) long, relative to the length of a typical O bar, and reliably reproducing such a small dimension in a manufacturing process is very difficult. The tolerances are now typically required to be $\pm 5\mu$in. ($\pm 0.1\mu$). While these tolerances can be achieved with known processes, the yield is not as good as is desired, and obviously, there is no way to correct defective gap lengths in individual cores.

There are a number of different ways in which the related problems of accurate gap formation and uniform I bar to C bar bonding may be effected in a manufacturing process. However, it is difficult to cause the individual surfaces of a pair of ferrite bars to accurately contact each other along the entire length of their bonding interface, and if there is not this intimate contact the bond is faulty in at least one of its mechanical and magnetic properties. A solution to this problem is provided in IEEE Transactions on Magnetics, Vol. MAG-20, No. 5, September 1984, pp. 1503-1505 by Rigby, "Diffusion Bonding of NiZn Ferrite and Nonmagnetic Materials", where a what will be hereafter referred to as a "granule vise" is described. Such a vise employs hard, heat resistant granules contained in a cylindrical cavity. Pairs of I and C ferrite bars with their surfaces to be bonded properly juxtaposed to form unbonded O bars are embedded in the granules. Then powerfully compressing the granules with a piston or die driven into the cavity strongly compresses the I and C bars against each other. Applying heat to the unbonded O bars while thus compressing them against each other results in high quality diffusion bonding along the entire length of the interface where the I and C bars contact each other.

To assure a strong mechanical bond between the I and C bars and between the I and C cores after the individual cores are cut from the bonded O bars, it is the usual practice to place a small bonding glass rod in the interior opening of each unbonded O bar adjacent the edge of the flux gap where it is bordered by the interior opening. The heat of the bonding operation melts the glass, causing it to form a glass fillet adjacent to the interior edge of the flux gap. By orienting the O bars with the interior edges of their flux gaps below the remainder of the O bars' interior openings, the glass will flow under the force of gravity into the space adjacent the interior edge of the flux gap thereby firmly attaching the I bars to the C bars, and, after the sawing operation, the individual I and C elements of the cores to each other.

BRIEF DESCRIPTION OF THE INVENTION

To allow the use of such a granule vise to solve the problem of poorly controlled gap length along the length of the O bars, it is necessary to orient the individual unbonded O bars so that the direction of force applied to the pressure die is along the length of the gap, length as defined earlier being the spacing of the C bar from the I bar. However, when an unbonded O bar is so oriented, the interior edges of the flux gap is not the lowest point within the interior opening of the O bar. Thus, the bonding glass rod will not reliably form the required glass fillet adjacent the flux gap.

To solve this problem, the granule vise and the heater for accomplishing the bonding of the I bar to the C bar form part of an apparatus which includes a base having a pair of projecting, spaced apart arms and a rigid frame mounted between the projecting arms for rotation about a horizontal axis. The frame has spaced apart mounting beams, on one of which the granule vise is mounted. The granule vise includes a heat resistant cylinder block having a cylindrical cavity therein opening toward the other mounting beam of the frame with the axis of the cylindrical cavity directed toward the other mounting beam. A quantity of rigid, heat resistant granules at least partly fill the cylindrical cavity, and in these granules the individual unbonded O bars may be embedded with the flux gap length dimension of each substantially parallel to the axis of the cavity and with the interior edge of the flux gap of each unbonded O bar substantially parallel to the axis of rotation of the frame. The granule vise also includes a heat resistant pressure die having an external cylindrical shape substantially conforming to the cylindrical cavity and adapted to slide into the cylindrical cavity along the cavity's axis, and compressing means mounted on the other mounting beam for forcing the pressure die into the cylindrical cavity to compress the granules. Compressing the granules also compresses the individual O bars so that the I bars are pressed against the adjacent C bars along their bonding interfaces. A heating means is attached to the one mounting beam in surrounding relation to the cylinder block so as to permit heating the contents of the cylinder block cavity.

To use this apparatus, the frame is rotated to place the cylinder block with its cavity open upwardly and a quantity of granules is poured into the cavity. Then a quantity of assembled but unbonded O bars with rods of bonding materials within the interior opening is laid on the granules. The O bars should all be similarly oriented with the flux gap length dimension of each O bar aligned with the cavity axis and the length dimension of each O bar aligned with the axis of rotation of the frame. The same one of the C bar or the I bar should be at the bottom of each O bar as well. Then the unbonded O bars are covered with a quantity of granules, the pressure die is inserted into the cylinder block cavity, and the compressing means is activated to force the die into the granules. The frame is rotated to orient each unbonded O bar with the interior edge of its flux gap at the lowest point within the interior opening of each O bar, allowing each rod of bonding material within an O bar interior opening to fall into a position adjacent to the interior edge of the flux gap. Upon activating the heating means, the rod of bonding material melts to thereby form the fillet of bonding material adjacent the interior edge of the flux gap at the same time effecting the diffusion bonding of the I bar to the C bar to form the bonded O bar. Typically, the compressing means is used to only slightly compress the granules before the frame is rotated so as to keep the orientation of the O bars unchanged during the frame rotation. After the heating means has been activated, then the compressing means is further activated to create the pressure needed at the bonding interface to cause the I and C bars to bond to each other.

Accordingly, one purpose of the inventions described is to develop uniform pressure across the entire bonding interface area when bonding the ferrite C and I bars to each other to form an O bar from which transducer head cores may be cut.

Another purpose is to accurately control the gap lengths in individual cores.

A further purpose is to accurately control the amount of clamping pressure applied to ferrite pieces to be bonded into complete bars.

Yet another purpose is to increase the yield of the products requiring high uniform clamping pressures.

Another purpose is to allow a number of workpieces to be clamped at the same time, increasing the capacity of this aspect of the manufacturing process.

Another purpose is to properly position a bonding glass rod within an unbonded O bar during bonding of the I bar to the C bar to form a fillet along the interior edge of the flux gap of the O bar.

BRIEF DESCRIPTION OF THE DRAWINGS

FIG. 1 is a front view of apparatus including a granule vise mounted for rotation from a position with the cavity in which the compression occurs open upwards, to a position with the cavity on its side.

FIG. 2 is a side view of the apparatus of FIG. 1.

FIG. 5 is a perspective sketch of ferrite C and I bars aligned for bonding and held in alignment with temporary adhesive.

FIG. 6 is an end view of an O bar as it is oriented within the apparatus of FIG. 1.

FIG. 7 is a view of the O bar shown in FIG. 6, in the position assumed when the frame of the apparatus of FIG. 1 is rotated into the position shown in FIG. 3.

FIG. 8 is the view of the O bar shown in FIG. 7 after the bonding process has been completed.

DESCRIPTION OF THE PREFERRED EMBODIMENTS

Figure 3:
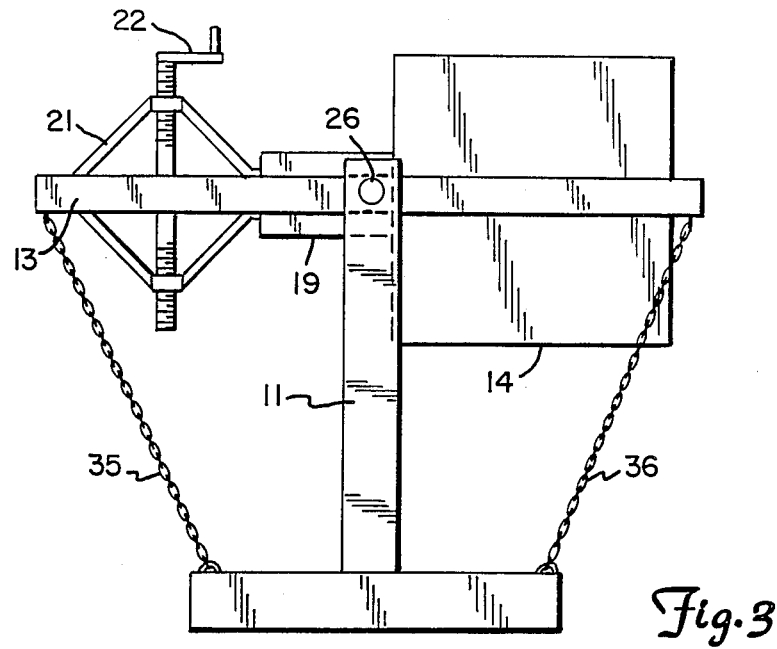
FIG. 3 is a side view of the apparatus of FIG. 1, with the frame rotated into the position allowing the bonding glass rods within the interior openings of the O bars to fall into positions adjacent to the interior edges of the flux gaps.

It is perhaps easiest to first discuss the workpiece for which this invention is intended. FIG. 5 shows an O bar 50 made of magnetic ferrite which after assembly, including bonding of its individual elements, is to be cut along lines 51 into individual transducer head cores. The O bar 50 is formed of a C bar element 52 and an I bar element 53 the bonding of which is the subject of this invention. The O bar 50 has a flux gap 55 which will become the individual flux gaps of the transducer head cores into which O bar 50 will be eventually be cut. O bar 50 also has an interior opening 54 which extends the length of the O bar 50 to become the windows of the individual cores. The O bar 50 as shown in FIG. 5 is still unbonded with the I bar 53 and the C bar 52 juxtaposed so as to provide an O-shaped magnetic flux path for the individual cores. The location of the two surfaces of the I bar 53 and C bar 52 at or near the flux gap 55 and which directly face and contact each other, where the bond is created, is referred to hereafter as the bonding interface. To aid in maintaining this juxtaposition for the I and C bars, small amounts of adhesive 56 are temporarily placed as shown to fasten the I bar 53 to the C bar 52. Cyanoacrylates are preferred for the temporary adhesive. After bonding, the I bar 53 is firmly attached to C bar 52 directly through the flux gap 55, as well as through the back gap 57 and by fillet material which is within the interior opening 54 but not shown in FIG. 5.

FIG. 1 shows the apparatus 1 which is used to simultaneously bond a number of the O bars 50 shown in FIG. 5. This apparatus includes a base 10 having a pair of projecting, spaced apart arms 11 and 12. A frame 13 is mounted for rotation between the arms 11 and 12 on pivots 26, and includes a pair of spaced apart horizontal mounting beams 29 and 30. A heating means comprising an electric oven 14 attached to mounting beam 29 within which is carried a heat resistant cylinder block 15 having a cylindrical cavity 16 therein attached, preferably through oven 14, to mounting beam 29. Cylindrical cavity 16 has an opening facing mounting beam 30 and accessible through oven 14. Cylinder block 15 and pressure die 19 may both be made of silicon carbide or other hard, refractory material. It is equally preferred to design the cylinder block in two parts with a movable pressure die directly attached to mounting beam 29 forming the bottom of cylindrical cavity 16.

Figure 4:
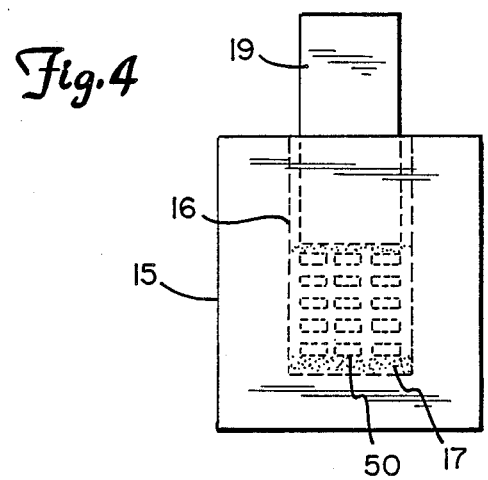
FIG. 4 is a schematic view of the granule vise or clamp for use in bonding ferrite cores, which form a part of the apparatus of FIG. 1.

A quantity of rigid, heat resistant granules 17 at least partly fill the cavity 16. During operation of this apparatus there are embedded within these granules 17 at least one, and preferably a number of unbonded O bars 50, as is shown in FIG. 4. These may be stacked in layers with a quantity of granules 17 separating each bar 50 in a layer and each layer from each other. A suitable spacing of each O bar 50 from its neighbors may be a few tenths of an inch both within a layer and from the layers above and below. It can thus be seen than even a small granule vise of a few inches in diameter and length can be used to bond batches of several hundred O bars simultaneously.

To apply compressive force to granules 17 and each O bar 50 embedded within them, there is provided a pressure die or piston 19 having an external cylindrical shape substantially conforming to the cylindrical cavity 15 and adapted to slide into the cylindrical cavity. One end of a compressing means preferably comprising a scissors jack 21 having a crank 22 for rotating the jackscrew of jack 21, is attached to mounting beam 30, and the other end of jack 21 is attached to an end of pressure die 19, preferably through a load sensor 20. Jack 21 is more easily seen in FIGS. 2 and 3. It is convenient that pressure die 19 be detachable from jack 21, so it is preferable to use nuts and bolts for attaching them to each other. Load sensor 20 provides signals on connector 34 to a control panel 25. Panel 25 provides a display 27 which responsive to these signals, provides a visible readout of the load exerted by jack 21 on die 19.

Oven 14 receives electrical power from control panel 25 via power cord 23. A thermometer 31 senses the temperature within oven 14 and adjacent cylinder block 15 and provides an electrical signal on conductor 32 to control panel 25. Panel 25 responsive to this signal, provides a visible readout on display 33 of the temperature sensed by thermometer 31.

FIGS. 6-8 each show the end view of an unbonded O bar 50 at different stages of the manufacturing process bonding the I bar 53 to the C bar 52 to thereby form the bonded O bar 50 as shown in FIG. 8. In FIG. 6, bonding glass rod 60 is shown within the interior opening 54 of unbonded O bar 50. The interior edge 62 of flux gap 55 is shown as a point, but it should be understood that this edge extends the length of bar 50, as does rod 60. Rod 60 should be formed of glass material which melts and bonds to the ferrite comprising O bar 50 at or below the temperature at which the bonding of the I bar 53 to the C bar 52 occurs. Dashed line 63 indicates the approximate configuration of the eventual transducing surface of individual cores after the bonded bar 50 has been machined to properly set the height of gap 55 for the individual cores. It should be understood that the height dimension here is essentially the distance between the interior edges 62 and the exterior edges of the individual cores' flux gaps. Arrows 61 indicate the direction of force to be applied by the apparatus of FIG. 1 during bonding to accurately control the gap length in gap 55 along the entire length of bar 50. To assure that the granule vise of FIG. 1 accurately applies force uniformly to all the O bars 50 within cavity 16 and thus assure that the gap lengths are uniform from bar 50 to bar 50, it is necessary that within cavity 16 all have their flux gaps 55 oriented with the gap length dimension substantially parallel to the axis of cavity 16. Further, to make use of this invention, it is necessary that the interior edge 62 of the flux gap 55 of each unbonded bar 50 as embedded within the granules 17 within cavity 16 is positioned parallel to the axis of rotation of frame 13. It is also necessary that the orientation of each bar 50 within cavity 16 as one faces them, have their flux gap 55 on the same side of interior opening 54.

After the unbonded O bars 50 have all been properly embedded in the granules 17 within cavity 16, pressure die 19 is inserted into cavity 16 and attached to the one end of jack 21. A small amount of preload is applied to die 19 by turning crank 22, and then frame 13 is rotated approximately 90° to orient each unbonded O bar 50 within cavity 16 with the interior edge 62 (FIG. 7) of its flux gap 55 at the lowest point within the interior opening 54. This causes rod 60 to fall into a position adjacent to the interior edge 62 of flux gap 55 where upon heating, fillet 80 (FIG. 8) will be formed from rod 60. FIG. 3 shows frame 13 thusly rotated, and chains 35 and 36 have been attached to frame 13 to stabilize it in this horizontal position.

Figure 9:
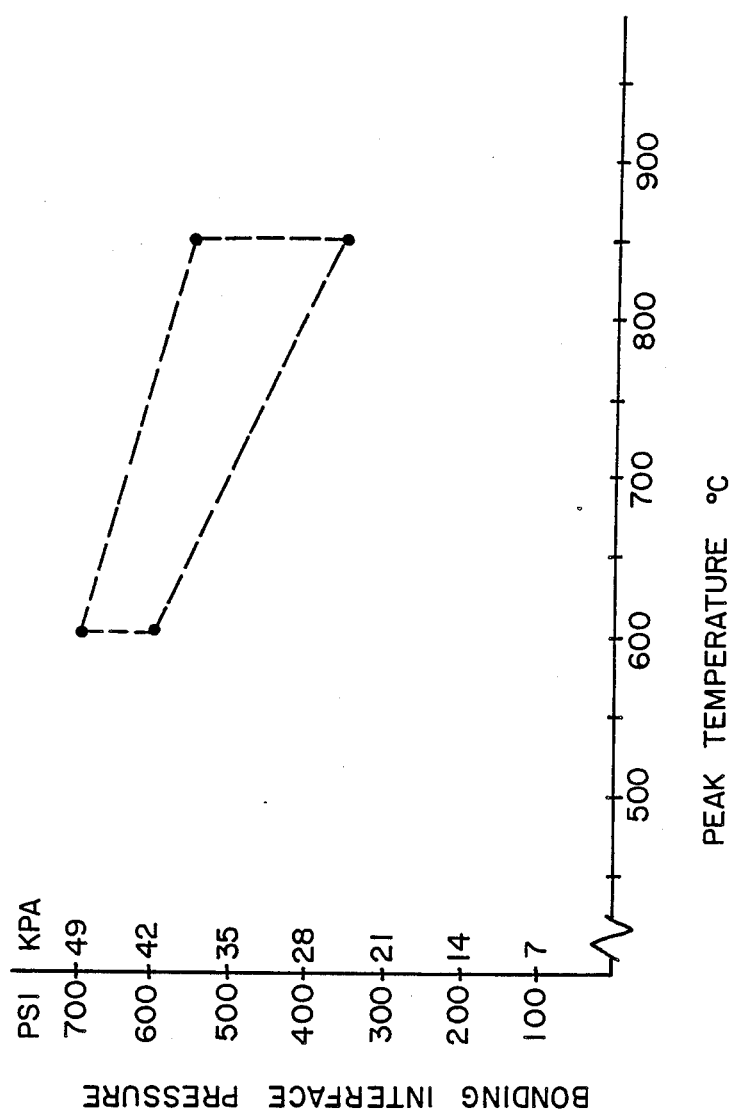
FIG. 9 is a graph of the operating ranges for temperature and pressure necessary to form acceptable bonds between two surfaces of ferrite of a particular type.

While not necessary to understand this invention, in the interests of complete disclosure, the general outline of the bonding process will be explained as well. The parameters supplied are for ferrite comprising 53% $Fe_2O_3$, 30% MnO, and 17% ZnO, all by mol percentage. The bond between I bar 53 and C bar 52 is established by diffusion or thermal compression bonding between ferrite sputtered on the gap material and the ferrite of the I or C bar. The graph of FIG. 9 shows the range of pressure and temperature necessary to effect complete bonding. The pressure specified is that at the bonding interface, i.e. at or adjacent to flux gap 55 and back gap 57, and the pressure at the face of pressure die 19 will have to be reduced to take into account the ratio of the combined areas of flux gap 55 and back gap 57, to the area of the outside surface of I bar 53/C bar 52.

FIG. 8 shows an end view of a bonded O bar 50. Glass fillet 80 is formed from glass rod 60 which melts and flows under the force of gravity into the position shown adjacent interior edge 62 of flux gap 55. Temporary adhesive amounts 56 are gone in this Figure, being either vaporized or oxidized by the bonding heat. The glass fillet 80 shown in FIG. 8 is required because of the fragility of the bond between the constituent I and C elements if only the diffusion bonding provides the mechanical connection between them. If glass rod 60 is not located adjacent interior edge 62 when heat is applied, the fillet 80 will not be properly sized or may not even be created.

In the bonding process step, after the cylindrical cavity 16 has been properly prepared and the frame has been rotated into the position shown in FIG. 3 with the individual O bars 50 positioned as shown in FIG. 7, power is supplied to the oven 14 by actuating switch 28. Then it is usually required to wait until the individual unbonded O bars 50 have stabilized their temperature within the range specified for the materials at the bonding interface between the I and C bars 53 and 52. In a typical installation, this will take several hours, depending on the heat output of the oven and the size and mass of the cylinder block 15 and the pressure die 19. The temperature is sensed by thermometer 31 and the indication provided by display 33. Then pressure in the range specified by FIG. 9 is applied to pressure die 19 by jack 21 for from one to three hours at which time bonding is completed. Pressure is then reduced to the preload level and the entire assembly is allowed to cool to room temperature. The bonded O bars 50 may then be removed from the granules 17 and moved to the next step of the process. The granules 17 may be sifted to remove those too small and reused.

The preceding has described our invention.

What we claim and desire to protect by letters patent is:

1. Apparatus for simultaneously bonding individual ones of ferrite I bars to individual ones of ferrite C bars to form a plurality of O bars each having approximately the exterior shape of a rectangular prism from which individual head cores may be cut, each said O bar having an interior opening which extends the length of the O bar and a non-magnetic flux gap layer extending the length of the O bar between opposing faces of the I and C bars and along the interior opening, said flux gap layer having an interior edge bordering the interior opening and a length defined by the thickness of the flux gap layer, each said O bar further requiring a fillet along the flux gap interior edge to be formed upon melting, by application of heat, of a rod of bonding material within the O bar interior opening, comprising (a) a base having a pair of projecting spaced apart arms;

(b) a rigid frame mounted between the projecting arms for rotation about a horizontal axis, said frame having spaced apart mounting beams;

(c) a heat resistant cylinder block attached to one mounting beam of the frame and having a cylindrical cavity therein opening toward the other mounting beam, and with the axis of the cylindrical cavity directed toward the other mounting beam;

(d) a quantity of rigid, heat resistant granules at least partly filling the cylindrical cavity, in which the individual unbonded O bars may be embedded with their gap length dimension substantially parallel to the axis of the cavity and their length dimension substantially parallel to the axis of rotation of the frame;

(e) a heat resistant pressure die having an external cylindrical shape substantially conforming to the cylindrical cavity and adapted to slide into the cylindrical cavity;

(f) compressing means mounted on the other mounting beam for forcing the pressure die into the cylindrical cavity to compress the granules, and (g) heating means mounted on the one mounting beam in surrounding relation to the cylinder block for heating the contents of the cylinder block cavity;

wherein activating the compressing means forcing the pressure die against the granules and rotating the frame to orient each unbonded O bar with the interior edge of its flux gap at the lowest point within the interior opening of each O bar, allows the rod of bonding material within its interior opening to fall into a position adjacent to the interior edge of the flux gap, to thereby cause the bonding material rod to form the fillet adjacent the flux gap upon activating the heating means.

* * * * *